(12) United States Patent
Cheng et al.

(10) Patent No.: US 9,205,795 B1
(45) Date of Patent: Dec. 8, 2015

(54) DEPLOYABLE INSTRUMENT PANEL TRIM

(71) Applicant: Ford Global Technologies, LLC, Dearborn, MI (US)

(72) Inventors: James Chih Cheng, Troy, MI (US); Parakrama V. Weerappuli, West Bloomfield, MI (US); Raed Essa El-Jawahri, Northville, MI (US); Mohammed Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/571,671

(22) Filed: Dec. 16, 2014

(51) Int. Cl.
*B60R 21/08* (2006.01)
*B60R 21/013* (2006.01)
*B60R 21/231* (2011.01)
*B60R 21/233* (2006.01)
*B60R 21/16* (2006.01)
*B60R 21/205* (2011.01)
*B60R 21/00* (2006.01)
*B60R 21/01* (2006.01)
*B60R 21/02* (2006.01)

(52) U.S. Cl.
CPC ............... *B60R 21/08* (2013.01); *B60R 21/013* (2013.01); *B60R 21/16* (2013.01); *B60R 21/205* (2013.01); *B60R 21/231* (2013.01); *B60R 21/233* (2013.01); *B60R 2021/0009* (2013.01); *B60R 2021/01286* (2013.01); *B60R 2021/024* (2013.01); *B60R 2021/0273* (2013.01)

(58) Field of Classification Search
CPC .... B60R 21/08; B60R 21/013; B60R 21/205; B60R 21/16
USPC .................................................. 280/732, 749
See application file for complete search history.

(56) References Cited

U.S. PATENT DOCUMENTS

| | | | | |
|---|---|---|---|---|
| 3,767,229 | A | * | 10/1973 | Cain ............................ 280/732 |
| 3,791,667 | A | * | 2/1974 | Haviland ................... 280/730.2 |
| 3,819,204 | A | | 6/1974 | Oka et al. |
| 3,820,621 | A | | 6/1974 | Breitschwerdt et al. |
| 8,267,424 | B2 | | 9/2012 | Tomitaka et al. |
| 8,414,018 | B2 | | 4/2013 | Choi et al. |
| 8,702,122 | B2 | | 4/2014 | Tomitaka et al. |

OTHER PUBLICATIONS

Saeki et al., "A Fundamental Study of Frontal Oblique Offset Impacts", Nissan Motor Co., Ltd., Japan, Paper No. 264, Apr. 2, 2002, 9 pages.

* cited by examiner

*Primary Examiner* — Faye M Fleming
(74) *Attorney, Agent, or Firm* — Frank A. MacKenzie; Bejin Bieneman PLC

(57) ABSTRACT

A passenger protection device includes a panel trim that is fittable to a vehicle instrument panel and a flexible sheet attached to each of at least a portion of the panel trim and at least a portion of an edge of the instrument panel.

19 Claims, 9 Drawing Sheets

DEPLOYABLE INSTRUMENT PANEL TRIM

BACKGROUND

Energy absorbers in a vehicle interior may be passive, e.g., not activated before or upon an impact, or may be active, e.g., deployed when an impact is sensed or predicted. For example, airbags may be provided to deploy in an interior of the vehicle. However, airbags do not provide adequate occupant protection in all impact situations, e.g., an oblique impact, i.e., situations where a vehicle is impacted at an angle of substantially 15-30° from a head-on collision.

DETAILED DESCRIPTION

Figure 2:
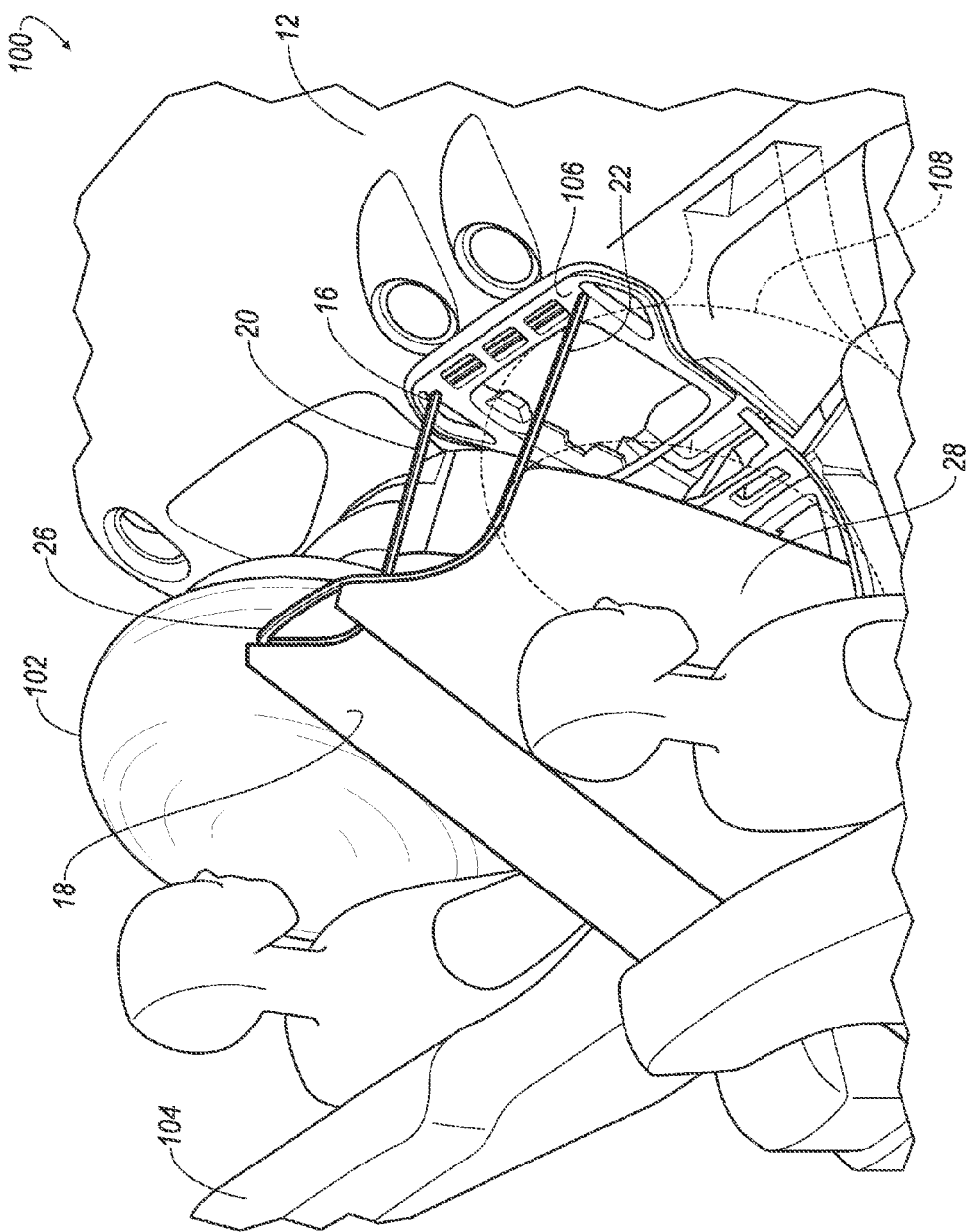
FIG. 2 is a perspective view of the passenger protection device of FIG. 1 in a deployed state.

With reference to the Figures, wherein like numerals indicate like parts throughout the several views, an passenger protection device 10 includes a panel trim 16 that is fittable to a vehicle instrument panel 12. As seen in FIG. 2, a flexible sheet 18 is attached to each of at least a portion of the panel trim 16 and at least a portion of an edge 14 of the instrument panel 12. The panel trim 16 is deployable when an impact is detected, whereupon the flexible sheet 18 extends tautly between the panel trim 16 and the edge 14 as seen in FIG. 2. The term "tautly" as used herein means that the sheet 18 extends with substantially no slack between the trim 16 and edge 14. However, even when taut, the sheet 18 may, e.g., due the nature of flexible material used for the flexible sheet 18, e.g., an elastic polymer or fabric, have some ability to flex or give to thereby absorb energy, e.g., when the sheet 18 is impacted by an object such as a human head or other body part.

Figure 1:
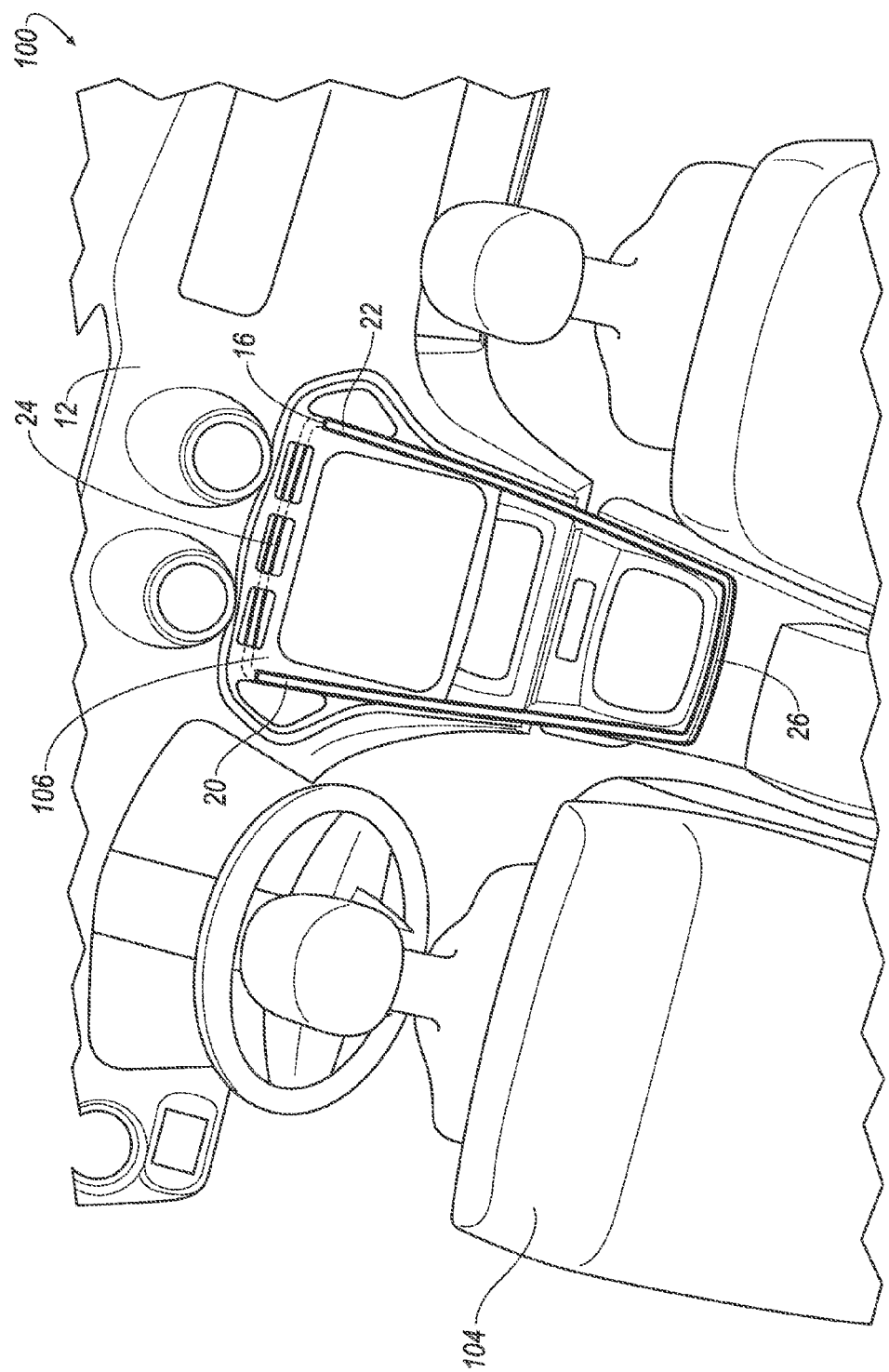
FIG. 1 is a perspective view of an exemplary oblique passenger protection system in a stowed state.

As seen in FIGS. 1 and 2, an oblique passenger protection system 100 includes a vehicle central console 106, the panel trim 16 extending along the central console 106 to a seatback 104 configured to deploy during an impact. The flexible sheet 18 connects the panel trim 16 and the central console 106 and extends along the central console 106.

Figure 3:
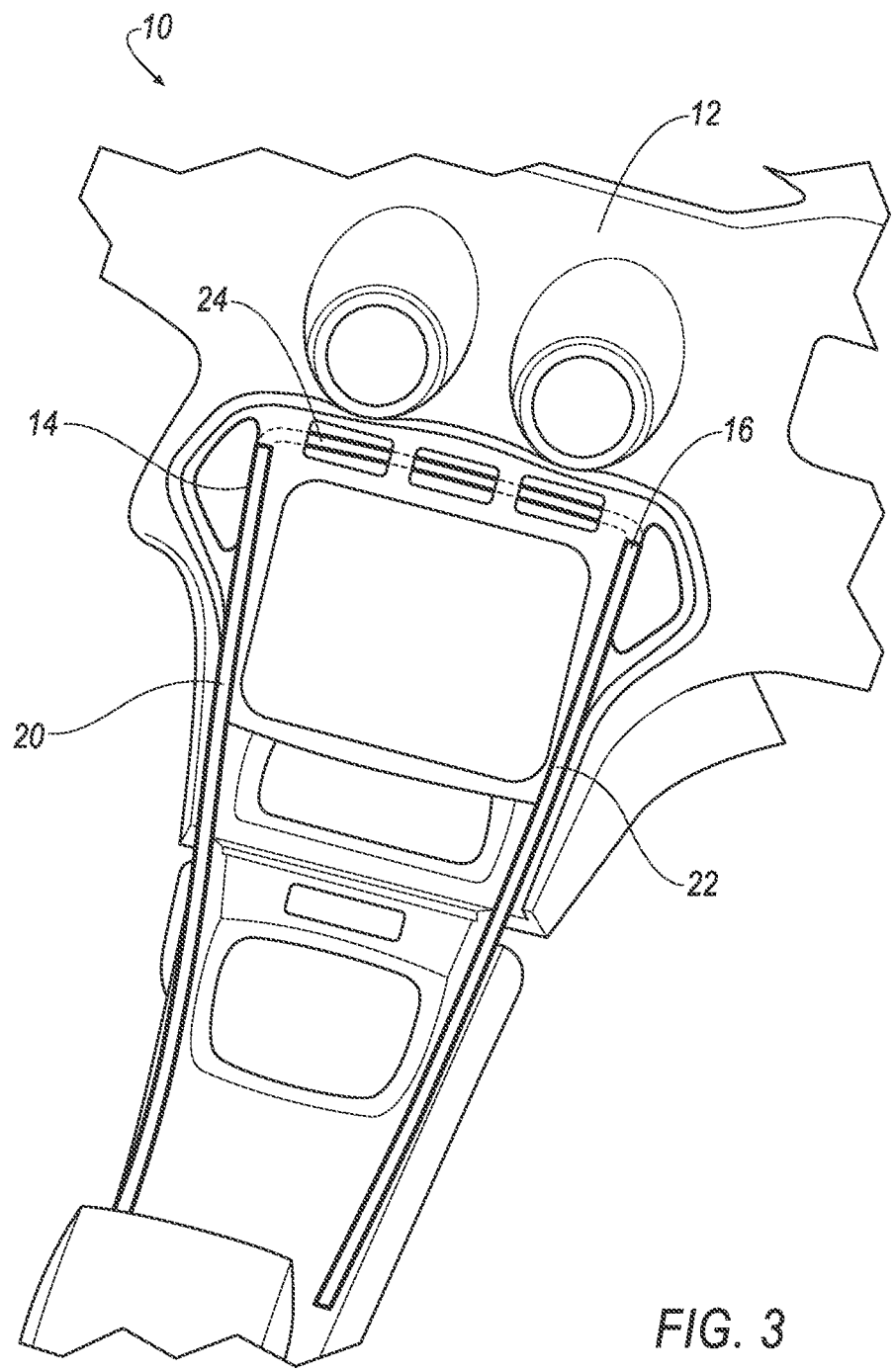
FIG. 3 is a perspective view of an exemplary passenger protection device in the stowed state.
Figure 4:
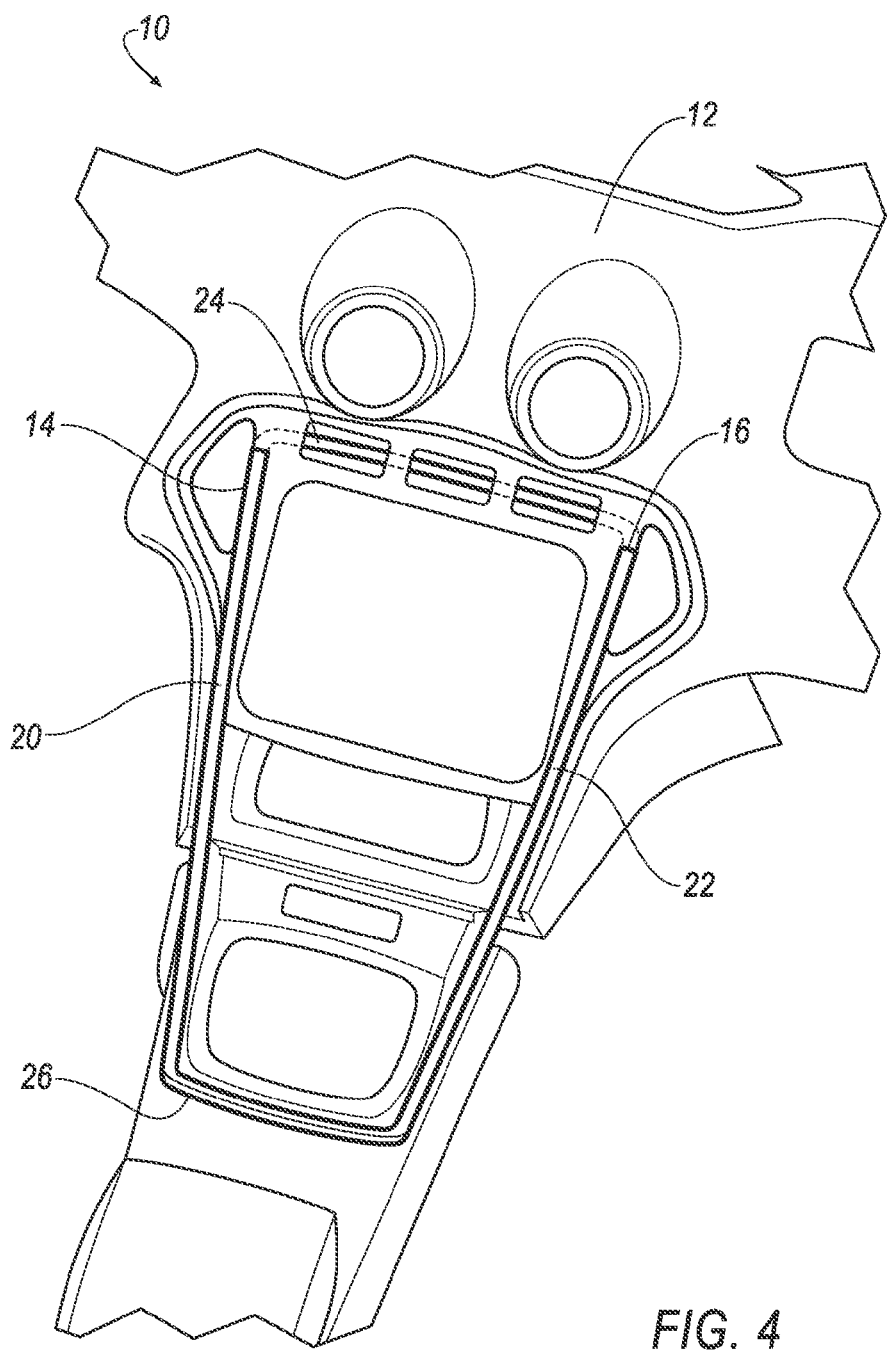
FIG. 4 is a perspective view of a second exemplary passenger protection device in the stowed state.

As seen in FIG. 3, the panel trim 16 includes a first arm 20 and a second arm 22 spaced opposite from the first arm 20. The panel trim 16 further generally includes a connecting arm 24 connecting the first and second arms 20, 22. The panel trim 16 typically provides a class-A surface and is designed to be an aesthetically pleasing part of a vehicle interior. As seen in FIG. 4, the panel trim 16 may further include a second connecting arm 26 that is spaced opposite from the connecting arm 24 and that connects the first and second arms 20, 22. For example, in the illustrated embodiment, the arms 20 and 22 are spaced opposite from one another such that the arms substantially mirror one another when installed respectively on a left and a right side of the center console 106. The arms 24, 26 may likewise mirror each other when spaced opposite from one another, the arm 24 being proximate, and the arm 26 being distal, with respect to a front of a vehicle.

Figure 5:
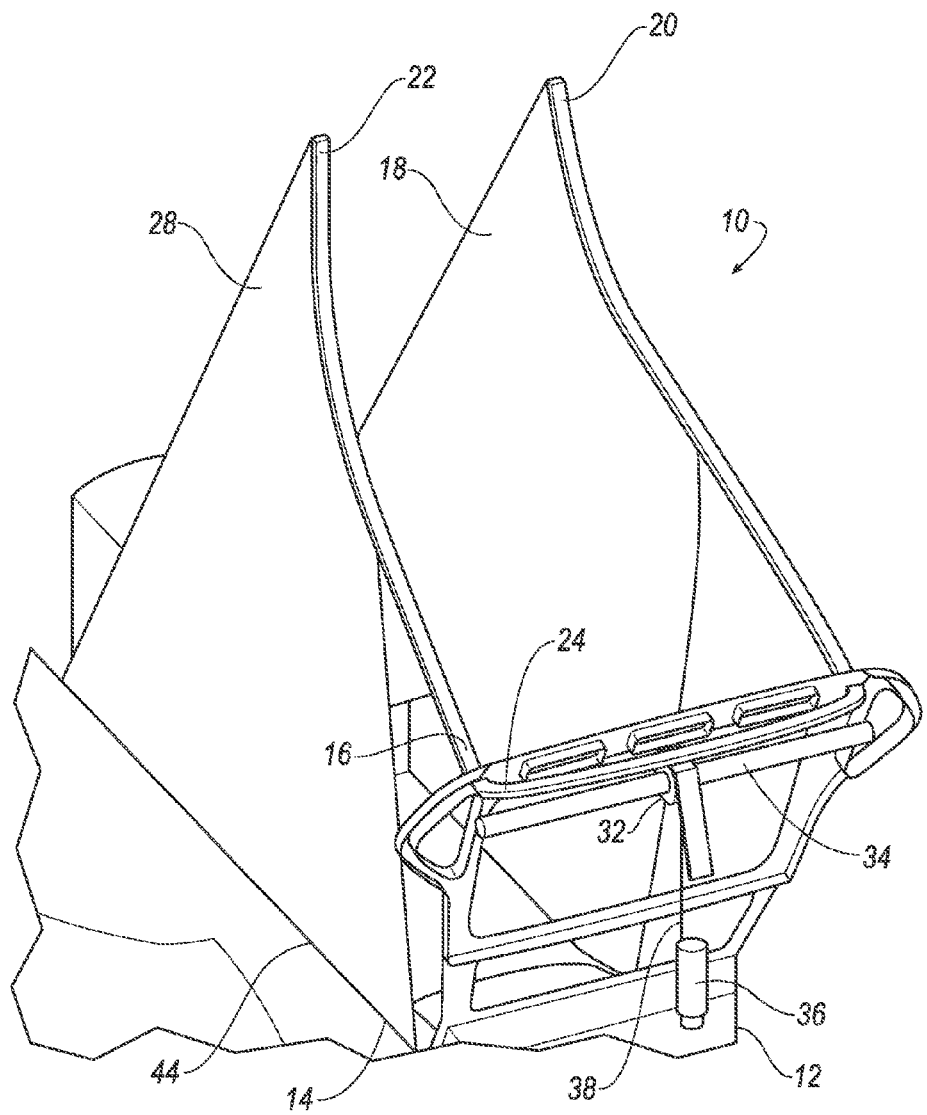
FIG. 5 is a perspective view of the passenger protection device of FIG. 3 in the deployed state.
Figure 6:
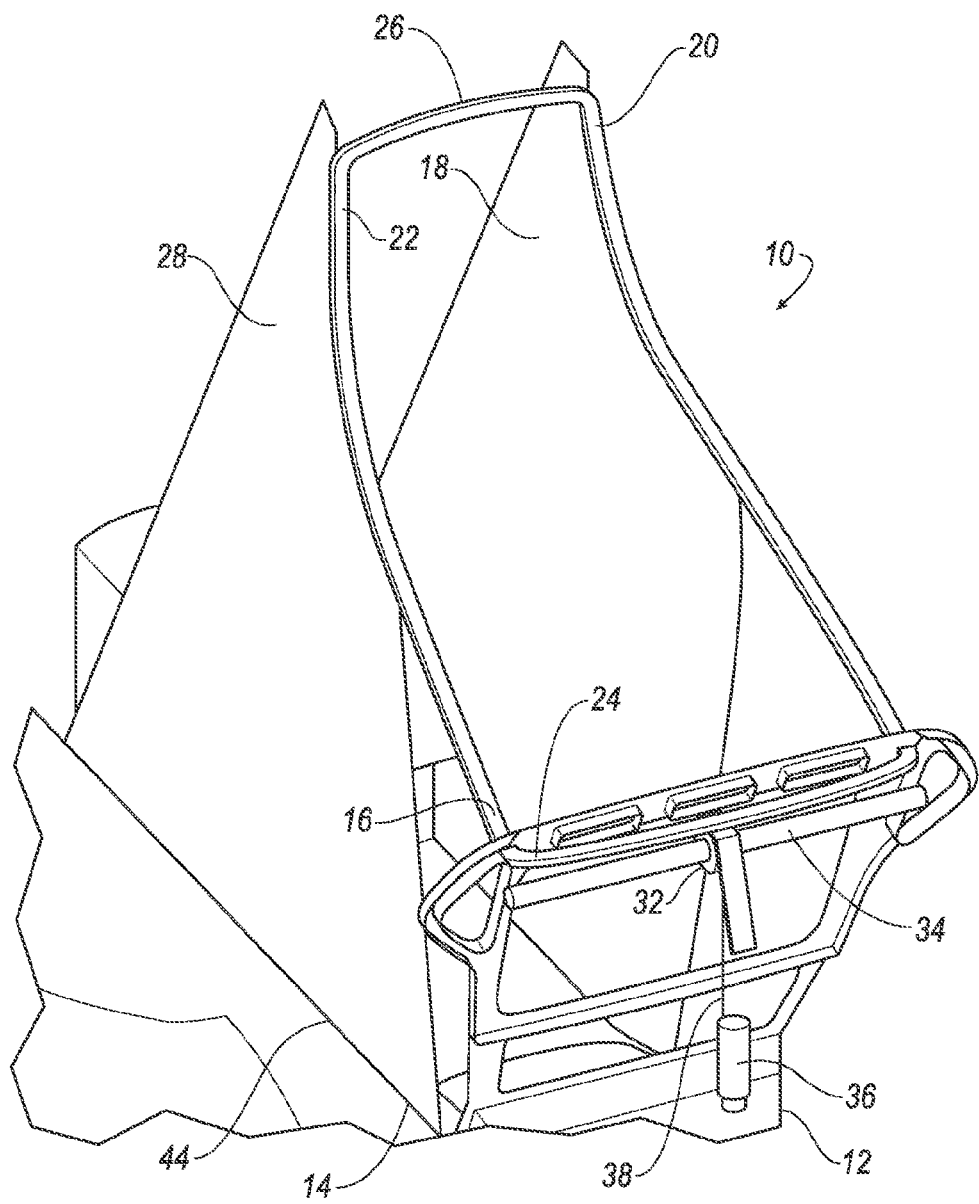
FIG. 6 is a perspective view of the passenger protection device of FIG. 4 in the deployed state.

As seen in FIG. 5, the flexible sheet 18 is attached at a first sheet edge 17 to a first portion 15 of the panel trim 16 and at a second sheet edge 19 to a first portion 13 of the edge 14 of the instrument panel 12. The flexible sheet 18 may be constructed of a flexible material such as an elastic polymer or fabric. When deployed, the flexible sheet 18 extends tautly between the panel trim 16 and the edge 14, thereby creating an impact surface.

The passenger protection device 10 may further include a second flexible sheet 28. The second flexible sheet 28 extends from a first sheet edge 27 attached to a second portion 25 of the panel trim 16 to a second sheet edge 29 attached to a second portion 23 of the edge 14.

Figure 7:
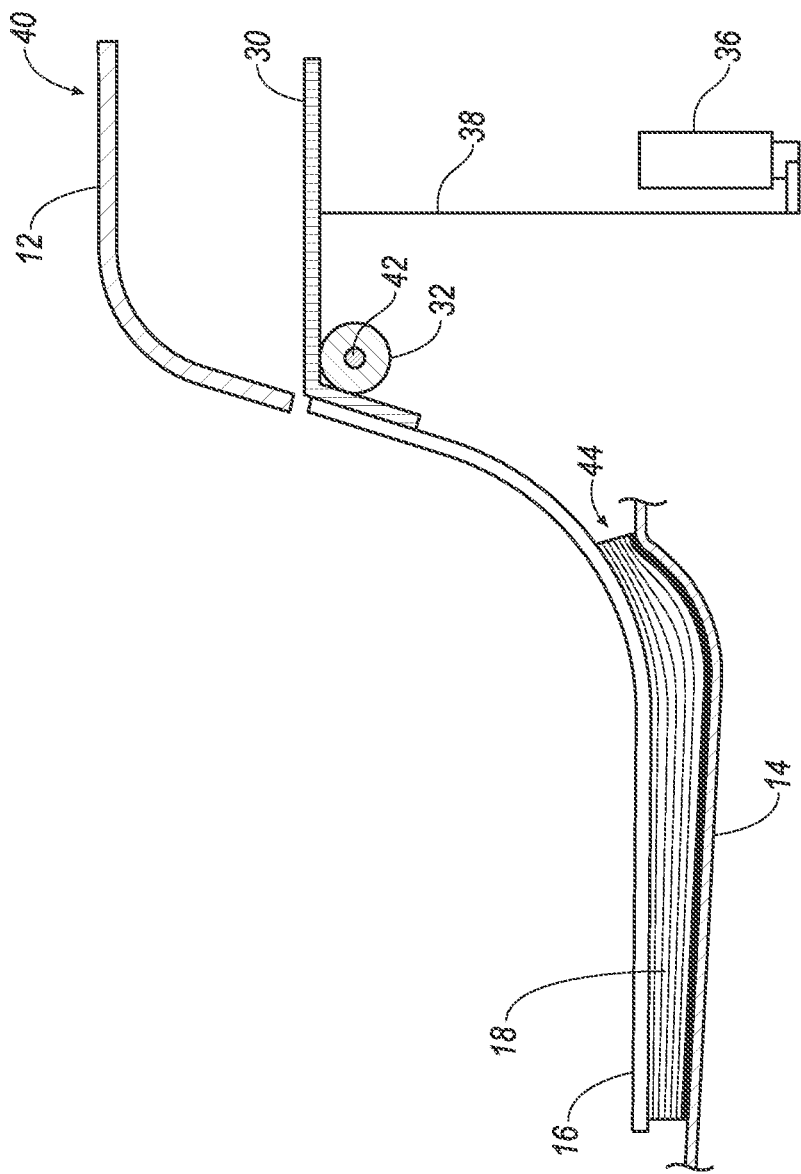
FIG. 7 is a side cross sectional view of the passenger protection device of FIG. 1 in the stowed state.

The edge 14 extends along the instrument panel 12. The panel trim 16 is fitted to the edge 14. The edge 14 includes a cavity 44. As seen in FIG. 7, the flexible sheet 18 may be stored within the cavity 44 in an undeployed state of the passenger protection device 10. The flexible sheet 18 is attached to the edge 14 at the second sheet edge 19, as described above. Attaching the flexible sheet 18 to the edge 14 allows the flexible sheet 18 to be extended tautly during the impact.

Figure 8:
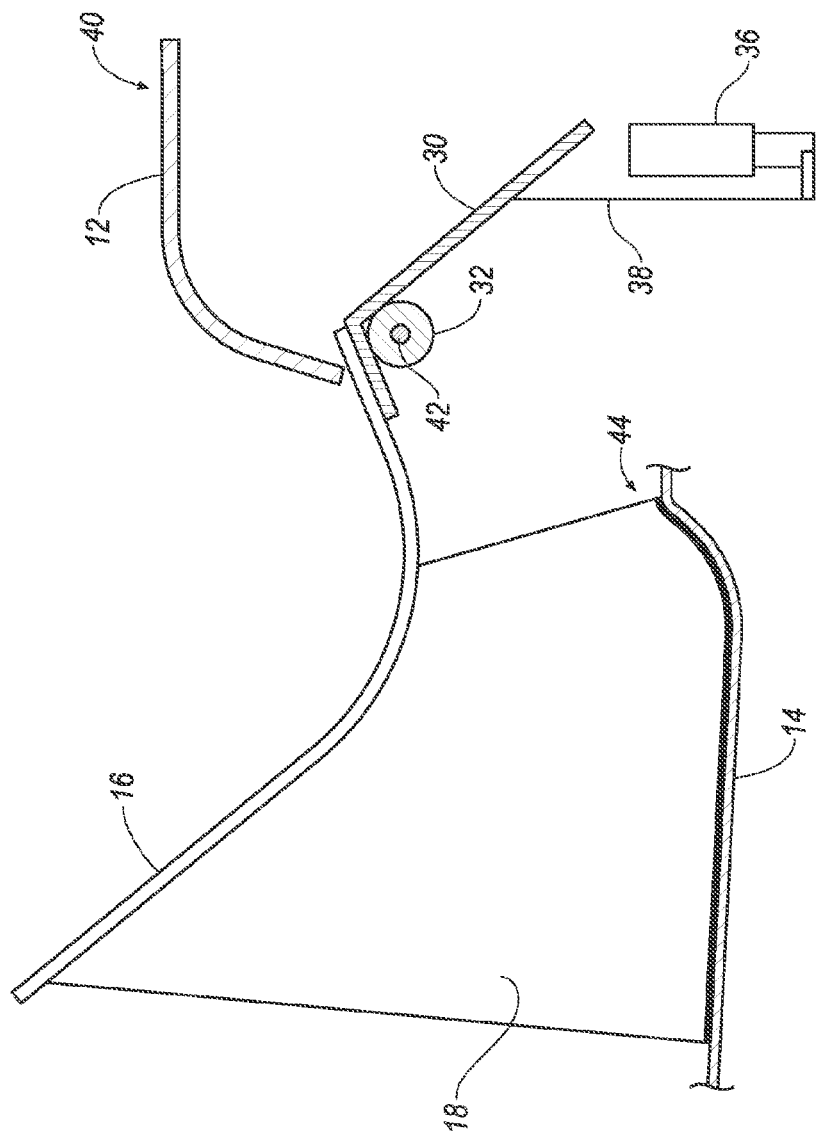
FIG. 8 is a side cross sectional view of the passenger protection device of FIG. 1 in the deployed state.
Figure 9:
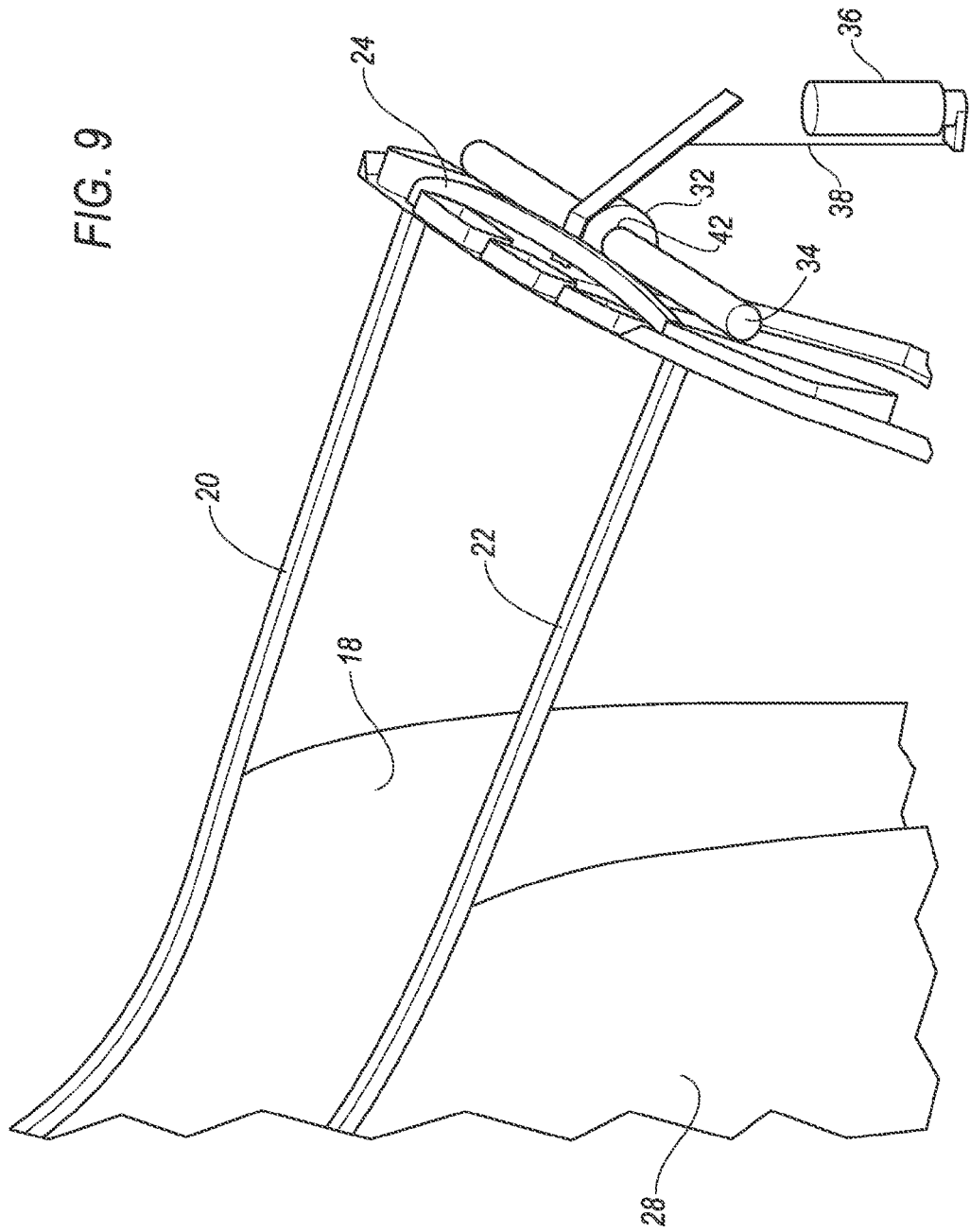
FIG. 9 is a perspective view of a pretensioner.

As seen in FIG. 9, the passenger protection device 10 may further include a pivot pin 32, a lever arm 30 attached to the panel trim 16, and a shaft 34 connected to the pivot pin 32. A cable 38 connects the lever arm 30 and a pretensioner 36. As seen in FIGS. 7 and 8, the pivot pin 32, lever arm 30, shaft 34, and pretensioner 36 are arranged to deploy the panel trim 16 during the impact.

The pivot pin 32 allows for deployment of the panel trim 16. The pivot pin 32 has a hole 42 extending through the pivot pin 32 to accommodate the shaft 34. The pivot pin 32 is supported by the shaft 34 and allows the lever arm 30 to pivot during deployment. The shaft 34 attaches to a frame (not shown) of the instrument panel 12 and remains stationary during deployment of the passenger protection device 10.

The lever arm 30 is attached to the panel trim 16 and sits atop the pivot pin 32. During deployment of the passenger protection device 10, the cable 38 pulls on the lever arm 30, the lever arm 30 pivots around the pivot pin 32, deploying the panel trim 16. The lever arm 30 allows the transfer of linear motion from the pretensioner 36 into rotational motion of the panel trim 16.

The pretensioner 36 may include a piston arranged to move to retract the cable 38. An ignitable charge or other triggering device such as is known may be arranged to move the piston when an impact is detected. The pretensioner 36 may alternatively include an electric motor. Upon impact, the pretensioner 36 pulls the cable 38, rotating the lever arm 30 around the pivot pin 32 and deploying the panel trim 16 and the flexible sheet 18.

As seen in FIG. 8, when deployed, the flexible sheet 18 extends above a top surface 40 of the instrument panel 12. The occupant may be taller than the instrument panel 12. Therefore, extending the flexible sheet 18 above the top of the instrument panel 12 allows the impact surface to receive the occupant during impact.

Referring back to FIG. 1, the central console 106 extends along the instrument panel 12 and houses the panel trim 16 and the flexible sheet 18. The panel trim 16 extends around the central console 106 prior to deployment. The central console 106 has a cavity 44 to store the flexible sheet 18 prior to deployment.

The oblique passenger protection system 100 may include an airbag 102 that deploys during impact at the same time as the panel trim 16. After deployment of the panel trim 16, the airbag 102 may contact the flexible sheet 18 to form the impact surface. When the airbag 102 and the flexible sheet 18 contact, the impact surface may receive the occupant from several directions. During an oblique impact, an occupant may move laterally into the flexible sheet 18, which then advantageously absorbs energy from the occupant. The vehicle may further include a second airbag 108 that contacts the second flexible sheet 28 to form the second impact surface. The second flexible sheet 28 provides a second impact surface for a second occupant during the impact should the second occupant move laterally.

The oblique passenger protection system 100 may include the seatback 104. During deployment, the flexible sheet 18 extends above the seatback 104 to receive the occupant during the impact should the occupant move toward the rear of the vehicle. The flexible sheet 18 thus may absorb impact energy from several directions. Accordingly, the device 10 including the flexible sheet 18 is sometimes referred to as an energy absorbing, or impact absorbing, device.

Further, a passive restraint controller (e.g., a programmable device including a processor and a memory) or the like may be provided, as is known, e.g., to deploy airbags and/or other passive safety systems in a vehicle, to detect an impact that is oblique or substantially oblique, and to deploy the device 10, e.g., trigger the pretensioner 36 as described above and in a known manner, upon so detecting an oblique or substantially oblique impact.

As used herein, the adverb "substantially" means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the components, processes, systems, methods, etc. described herein, it should be understood that these are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A device, comprising:
   a panel trim that is fittable to a vehicle instrument panel and that includes a first arm spaced opposite from a second arm, and a connecting arm connecting the first and second arms; and
   a flexible sheet attached to each of at least a portion of the panel trim and at least a portion of an edge of the instrument panel.

2. The passenger protection device of claim 1, wherein the flexible sheet extends tautly between the panel trim and the edge in a deployed state.

3. The passenger protection device of claim 1, further comprising a second flexible sheet, wherein the flexible sheet extends between the first arm and a first portion of the edge and the second flexible sheet extends between the second arm and a second portion of the edge.

4. The passenger protection device of claim 3, further comprising a second connecting arm that is spaced opposite from the connecting arm and that connects the first and second arms.

5. The passenger protection device of claim 1, wherein the edge includes a cavity and the flexible sheet is stored within the cavity.

6. The passenger protection device of claim 1, further comprising:
   a pivot pin;
   a lever arm attached to the panel trim;
   a shaft connected to the pivot pin;
   a pretensioner; and
   a cable connecting the lever arm and the pretensioner.

7. The passenger protection device of claim 6, wherein the pretensioner includes a piston arranged to move to retract the cable and an ignitable charge arranged to move the piston when an impact is detected.

8. The passenger protection device of claim 6, wherein the pretensioner is an electric motor.

9. The passenger protection device of claim 1, wherein the flexible sheet in a deployed state extends above a top of the instrument panel.

10. An passenger protection system, comprising:
    a vehicle central console;
    a panel trim extending along the central console and configured to deploy during an impact;
    a flexible sheet connecting the panel trim and the central console;
    a lever arm attached to the panel trim positioned within the central console;
    a pivot pin, the lever arm positioned on the pivot pin and configured to rotate around the pivot pin;
    a shaft connected to the pivot pin;
    a pretensioner; and
    a cable connecting the lever arm and the pretensioner.

11. The oblique passenger protection system of claim 10, wherein the flexible sheet extends tautly between the panel trim and the central console in a deployed state.

12. The oblique passenger protection system of claim 10, wherein an airbag contacts the flexible sheet form an impact surface.

13. The oblique passenger protection system of claim 10, wherein the flexible sheet extends above a seatback in a deployed state.

14. The oblique passenger protection system of claim 10, wherein the panel trim has a first arm, a second arm spaced opposite from the first arm, and a connecting arm connecting the first and second arms.

15. The oblique passenger protection system of claim 14, further comprising a second flexible sheet, wherein the flexible sheet connects the first arm and the central console and the second flexible sheet connects the second arm and the central console.

16. The oblique passenger protection system of claim 15, further comprising a second connecting arm connecting the first and second arms spaced opposite from the connecting arm.

17. The oblique passenger protection system of claim 15, further comprising an airbag and a second airbag, wherein the airbag contacts the flexible sheet to form an impact surface and the second airbag contacts the second flexible sheet to form a second impact surface.

18. The oblique passenger protection system of claim 10, wherein the pretensioner includes a piston arranged to move to retract the cable and an ignitable charge arranged to move the piston when an impact is detected.

19. The oblique passenger protection system of claim 10, wherein the pretensioner is an electric motor.

\* \* \* \* \*